UNITED STATES PATENT OFFICE.

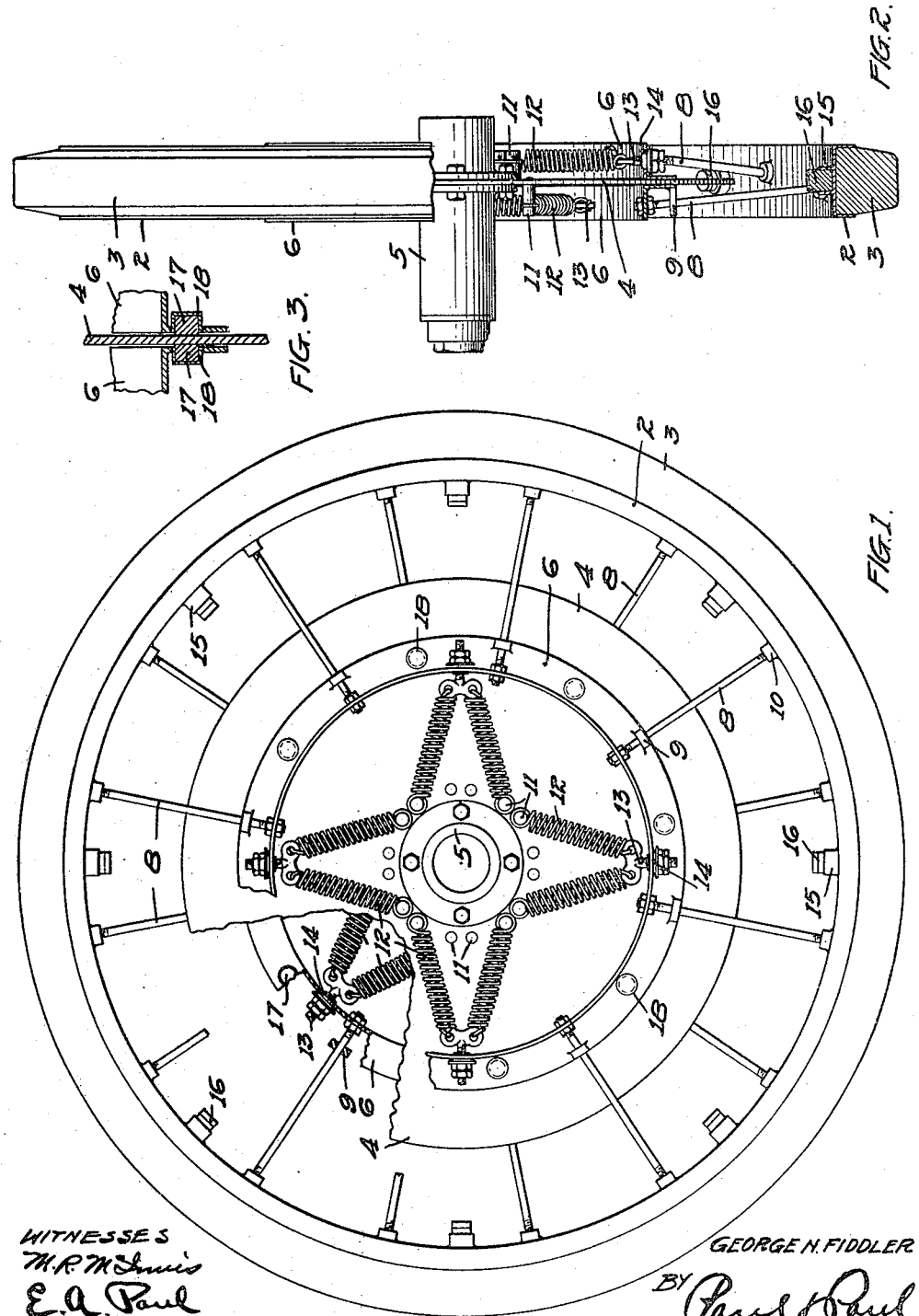

GEORGE N. FIDDLER, OF POLLOCK, SOUTH DAKOTA.

SPRING-WHEEL.

1,205,087.  Specification of Letters Patent.  Patented Nov. 14, 1916.

Application filed October 29, 1915. Serial No. 58,633.

*To all whom it may concern:*

Be it known that I, GEORGE N. FIDDLER, citizen of the United States, resident of Pollock, county of Campbell, State of South Dakota, have invented certain new and useful Improvements in Spring-Wheels, of which the following is a specification.

The object of my invention is to provide a vehicle wheel having a yielding support for the axle and dispensing entirely with the usual pneumatic tire, and avoiding the expense and annoyance of punctures, blowouts and the like.

A further object is to provide a wheel of simple construction and one which will be extremely strong and durable.

Other objects of the invention will appear from the following detailed description.

The invention consists generally in various constructions and combinations, all as hereinafter described and particularly pointed out in the claims.

In the accompanying drawings forming part of this specification, Figure 1 is a side elevation of a wheel embodying my invention, Fig. 2 is an edge view, partially in section, illustrating the construction of the wheel. Fig. 3 is a detail sectional view, through the disk rings.

In the drawing, 2 represents a rim, preferably of channel bar construction, having a seat for a suitable tire 3, preferably of hard rubber.

4 is a flat plate or disk, in which the hub 5 of the wheel is centrally mounted.

6 represents rings made preferably of angle bar, having one flange seated on the opposite faces of the disk 4, as shown in Fig. 2. The disk is free to slide between these rings. Spokes 8 are connected at their inner ends to the horizontal flange of said rings and pass through lugs 9 on said flanges and are tapped into suitable bosses 10, provided on the inner face of the angle bar 2. These spokes are provided preferably with threaded inner ends and nuts for the purpose of tightening the adjustment of the spokes and, as shown in Fig. 1, I prefer to arrange the spokes in staggered relation so that one spoke will be on one side of the disk and the next adjoining spoke on the opposite side. This serves to stiffen the wheel.

The plate 4 is provided with outwardly projecting pins 11 arranged preferably in pairs and springs 12, helical in form, are loosely connected at one end to these pins and radiate therefrom to bolts 13, which are loosely mounted at 14 in the outwardly projecting flanges of the rings 6. The bolts 14 are provided with adjusting nuts by means of which the tension of the springs can be increased or decreased and said bolts are free to rock in their bearings to compensate for the varying positions and strains on the springs.

I prefer to arrange the springs in pairs, as shown, each pair having its outer ends connected to one bolt and diverging therefrom toward the pins of adjoining pairs, and the springs on one side of the disk alternate or are staggered with respect to the arrangement of the springs on the other side. When, therefore, the wheels drop into a rut or depression in the roadway, or pass over an obstruction, the shock or jar to the occupants of the vehicle will be taken up by the yielding of the springs, the disk sliding up and down between the rings and accommodating itself automatically to the varying positions of the wheel. At intervals on the inner face of the rim I prefer to provide stops or yielding buffers, consisting of sockets 15 in which yielding plugs 16 of rubber or other suitable material are inserted. These are in position to contact with the edge of the disk and form yielding stops, so that when the springs are subjected to extreme strain when the vehicle is passing over a very rough roadway, the disk will be checked before it moves a sufficient distance to contact with the rim of the wheel. I also prefer to provide yielding blocks 17 fitting within recesses 18 in the rings and adapted to bear on the surface of the disk. These blocks prevent the rings and disk from rubbing upon one another. These blocks will serve to prevent any noise or rattle which might occur through wear of the parts or the rubbing of the rings upon the disk.

In various ways the details of construction herein shown and described may be modified and still be within the scope of my invention.

I claim as my invention:

1. A wheel comprising a rim, a pair of rings composed of angle bar arranged concentric with said rim, a series of spokes rigidly connecting the outwardly projecting flanges of said rings with said rim, a flat disk interposed between the other flanges of said rings and having freedom of movement in the plane of the wheel, a hub centrally mounted in said disk, and helical springs connecting said disk adjacent to said hub with said rings.

2. A wheel comprising a rim, a pair of rings arranged concentric with said rim in opposing relation to one another, said rings having outwardly projecting flanges and lugs formed thereon, spokes secured at their outer ends to said rim and passing through said lugs and seated at their inner ends in said flanges, a disk interposed between said rings and slidable in the plane of the wheel, a hub mounted in said disk, and yielding means connecting said disk and hub with said rings.

In witness whereof, I have hereunto set my hand this 21st day of October 1915.

GEORGE N. <sup>his</sup> X <sub>mark</sub> FIDDLER.

Copies of this patent may be obtained for five cents each, by addressing the "Commissioner of Patents, Washington, D. C."